(12) United States Patent
Cacchiotti et al.

(10) Patent No.: US 10,857,643 B2
(45) Date of Patent: Dec. 8, 2020

(54) DUST EXTRACTOR

(71) Applicant: Black & Decker Inc., New Britain, CT (US)

(72) Inventors: Richard Cacchiotti, Middle River, MD (US); Markus Rompel, Runkel Schadeck (DE); Klaus-Dieter Arich, Huenstetten-Beuerbach (DE); Arthur Lauer, Frankfurt (DE); Stefan D. Gensmann, Frucht (DE)

(73) Assignee: Black & Decker Inc., New Britain, CT (US)

( * ) Notice: Subject to any disclaimer, the term of this patent is extended or adjusted under 35 U.S.C. 154(b) by 8 days.

(21) Appl. No.: 16/127,614

(22) Filed: Sep. 11, 2018

(65) Prior Publication Data
US 2019/0084109 A1 Mar. 21, 2019

(30) Foreign Application Priority Data

Sep. 15, 2017 (GB) .................................. 1714857.8
Sep. 22, 2017 (GB) .................................. 1715360.2

(51) Int. Cl.
*B23Q 11/00* (2006.01)
*B25D 16/00* (2006.01)
(Continued)

(52) U.S. Cl.
CPC ...... *B23Q 11/0046* (2013.01); *B23Q 11/0071* (2013.01); *B25D 16/00* (2013.01);
(Continued)

(58) Field of Classification Search
CPC ............ B23Q 11/0046; B24Q 11/0071; B25D 16/00; B25D 17/20; B25F 5/02
(Continued)

(56) References Cited

U.S. PATENT DOCUMENTS 5,129,467 A 7/1992 Watanabe
7,017,680 B2 * 3/2006 Arich ................... B23Q 1/0009
173/171
(Continued)

FOREIGN PATENT DOCUMENTS

DE 112015000823 T5 11/2016
EP 1457288 A1 9/2004
(Continued)

OTHER PUBLICATIONS

EP Comm. Article 94(3) dated, Sep. 7, 2020 cited in co-pending application 18190166.1-1019.
EP ESSR dated, Feb. 28, 2019 cited in co-pending application 18190166.1-1019.

*Primary Examiner* — Nathaniel C Chukwurah
(74) *Attorney, Agent, or Firm* — Amir Rohani

(57) ABSTRACT

A dust extractor is provided including a main housing, a telescopic tubular extension arm comprising a first forward section slidable into or out of a second rear section over a stroke length between a first inner position and a second outer position, the second rear section being mounted onto the main housing, a shroud mounted on one end of the first forward section remote from the second rear section, a biasing force arranged to urge the first forward section to slide out of the second rear section towards the second outer position, and a dust collection box mounted on the main housing. The stroke length of the telescopic extension arm is greater than 150 mm.

19 Claims, 15 Drawing Sheets

(51) Int. Cl.
*B25D 17/20* (2006.01)
*B25F 5/02* (2006.01)
*B25D 17/24* (2006.01)

(52) U.S. Cl.
CPC ............... *B25D 17/20* (2013.01); *B25F 5/02* (2013.01); *B25D 16/006* (2013.01); *B25D 17/24* (2013.01); *B25D 2216/0084* (2013.01); *B25D 2217/0057* (2013.01); *B25D 2250/265* (2013.01)

(58) Field of Classification Search
USPC .... 173/198, 217, 171, 75, 209, 29, 197, 211
See application file for complete search history.

(56) References Cited

U.S. PATENT DOCUMENTS

| | | | |
|---|---|---|---|
| 7,354,226 B2 * | 4/2008 | Britz | B25F 5/008 408/67 |
| 2002/0141836 A1 * | 10/2002 | Ege | B23Q 11/0046 408/67 |
| 2004/0251041 A1 | 12/2004 | Grossman | |
| 2017/0203402 A1 | 7/2017 | Machida et al. | |

FOREIGN PATENT DOCUMENTS

| | | |
|---|---|---|
| EP | 1964649 A2 | 9/2008 |
| EP | 2067553 B1 | 10/2011 |
| EP | 2639010 A1 | 9/2013 |
| GB | 2486805 A | 6/2012 |
| JP | 2013078831 A | 5/2013 |
| JP | 2017127962 A | 7/2017 |

\* cited by examiner

Locked

Unlocked

DUST EXTRACTOR

CROSS-REFERENCE TO RELATED APPLICATIONS

This application claims priority, under 35 U.S.C. § 119, to UK Patent Application No. 17 148 57.8, filed Sep. 15, 2017, and UK Patent Applicant No. 17 153 60.2, filed Sep. 22, 2017.

FIELD

The present invention relates to a dust extractor for a power tool.

BACKGROUND

One type of power tool drill is a hammer drill which typically comprises an electric motor, a hammer mechanism and/or a rotary drive. The hammer drill is powered ether by an AC mains electric power supply or a battery attached to the hammer drill. A cutting tool, such as a drill bit, is supported within a tool holder mounted on the front of the hammer drill which is driven by the motor via either the rotary drive or the hammer mechanism or both to perform cutting operations. Such a hammer drill usually can operate in a hammer only mode, a drill only mode or a hammer and drill mode.

EP1157788 describes a typical example of hammer drill.

During the operation of a hammer drill, a large amount of dust can be generated. In addition to making the local vicinity dirty and clogging up the hammer drill, it can also be a health hazard to the operator of the hammer drill as the operator may breathe in the dust. As such it is desirable to collect the dust so that it can be safely disposed of.

One method of achieving this is to use a dust extractor which mounts onto the hammer drill. EP1245330 shows an example of a dust extractor.

Dust extractors are attached to the body of a hammer drill. The dust extractor comprises a main body and a shroud, typically mounted on the end of a tubular telescopic arm which is attached to the main body, and which surrounds the cutting tool and engages with the work piece being cut. The dust extractor comprises a dust collection box, a filter mounted within the dust collection box and an air suction device. Whilst the hammer drill is in use, the air suction device is switched on. During use, the dust generated by the cutting tool cutting the work piece enters the shroud. The air suction device draws the air together with dust from within shroud, through the telescopic arm into the dust collection box. The air passes then through the filter, whilst the dust is trapped by the filter within the dust collection box. The clean air is then typically expelled from the dust extractor. Once the operation of the hammer is complete, the dust extraction box can be removed from the dust extractor and the dust removed from the dust collection box and safely disposed of.

In some designs dust extractors, the air suction device can be located remotely from the body. In one example, the dust extractor could be attached to an industrial vacuum cleaner, the industrial vacuum cleaner forming the air suction device. In another example, the cooling fan of the electric motor of the hammer drill can be used as the air suction device and generate an air vacuum source which connects to the main body of the dust extractor. The air is drawn through the filter, out of the main body of the dust extractor and then into the housing of the hammer drill where it passes through the cooling fan of the hammer drill.

In alternative designs, a fan is rotatable mounted within the main body of the dust extractor adjacent the filter. The fan is rotatably driven by a motor to generate an air vacuum source and draw air from the shroud into the dust collection box and then through the filter before expelling it from the main housing. The fan can be rotatably driven by an electric motor mounted within the main housing of the dust extractor. EP1459842 discloses such a dust extractor. Alternatively, the fan can be releasably attached to the spindle of the drive motor of the hammer drill. DE4024022 discloses such a dust extractor.

SUMMARY

The present invention provides a solution by providing a dust extractor including a main housing, a telescopic tubular extension arm comprising a first forward section slidable into or out of a second rear section over a stroke length between a first inner position and a second outer position, the second rear section being mounted onto the main housing, a shroud mounted on one end of the first forward section remote from the second rear section, a biasing force arranged to urge the first forward section to slide out of the second rear section towards the second outer position, and a dust collection box mounted on the main housing. The stroke length of the telescopic extension arm is greater than 150 mm.

BRIEF DESCRIPTION OF THE DRAWINGS

An embodiment of the present invention will now be described with reference to the accompanying drawings of which.

DETAILED DESCRIPTION

Figure 1:
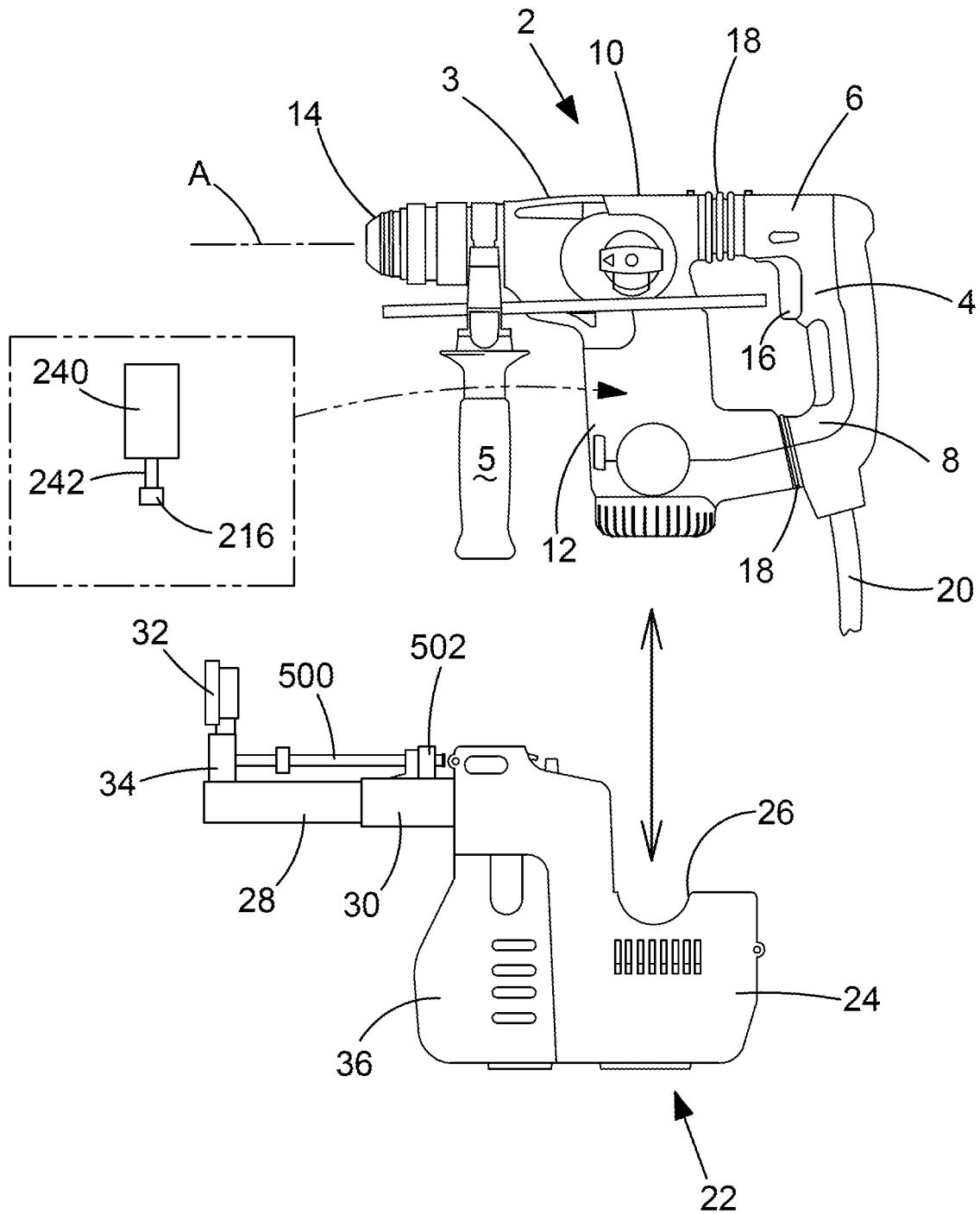
FIG. 1 shows a side view of a known design of hammer drill and known design of dust extractor.
Figure 2:
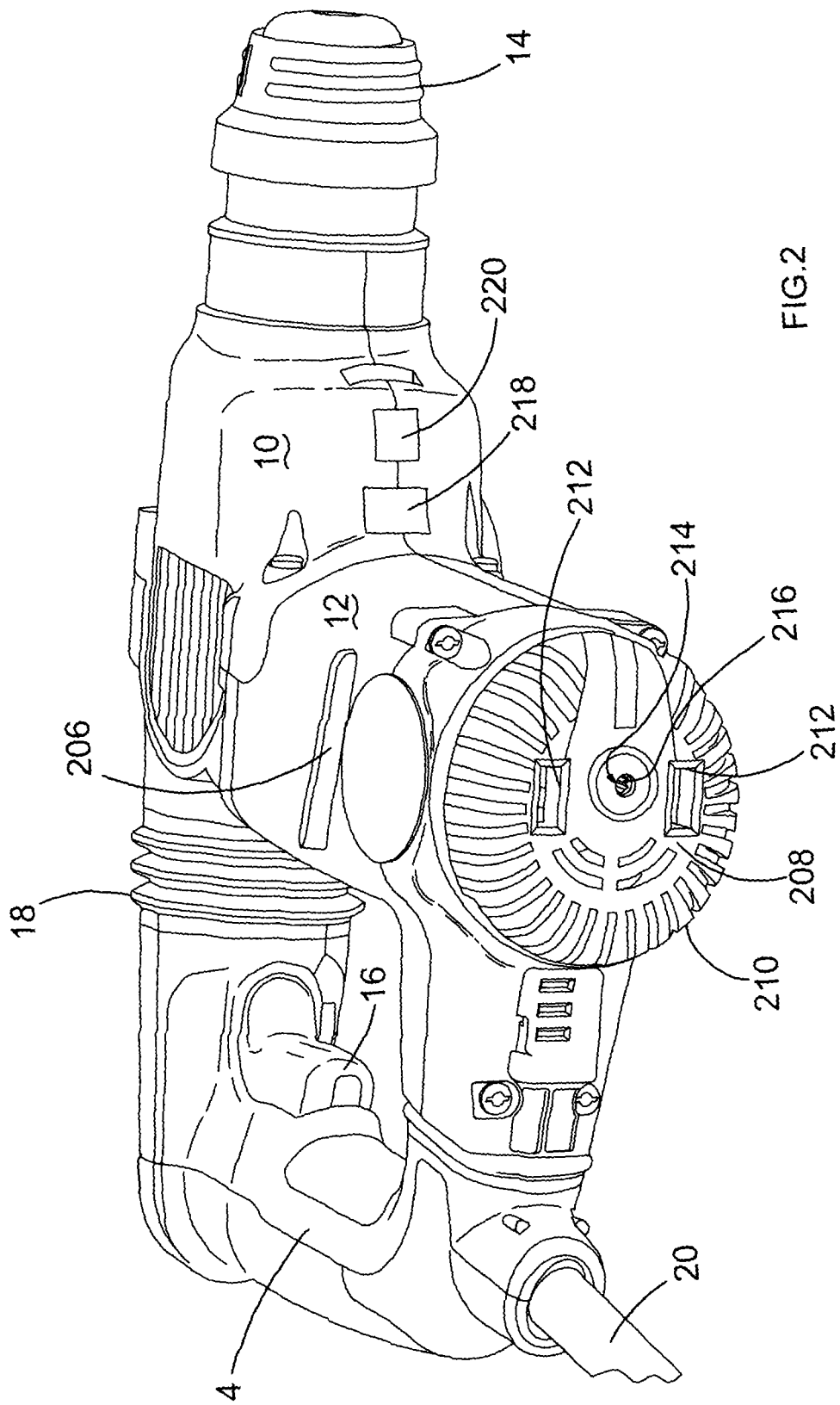
FIG. 2 shows a lower perspective view of the hammer drill used with a dust extractor in accordance with another known example of a hammer drill.

Referring to FIG. 1, a hammer drill comprises a main housing 2 and a rear handle 4 attached to the main housing 2 via vibration dampeners 18 at its upper 6 and lower 8 ends. The main housing 2 comprises a motor housing 12, in which is mounted an electric motor 240 having an output spindle 242 and a transmission housing 10, in which is mounted the hammer mechanism (not shown) and rotary drive (not shown). A mode change knob 3 is used to change the mode of operation of the hammer drill. A tool holder 14 is mounted on the front of the transmission housing 10 which is capably of releasably holding a cutting tool (not shown). The tool holder is cable of being rotated about axis A. A front handle is attached to the transmission housing 10 behind the tool holder 14. A trigger switch 16 is mounted within the rear handle 4 by which an operator can activate the hammer drill. An electric cable 20 connects to the base of the rear handle 4 by which a mains AC electric power supply is supplied to the hammer drill.

A typical dust extractor comprises a main housing 22 manufactured from two plastic clam shells 24, 26 which are joined together about a vertical plane using screws. Mounted on the top of the main housing is a telescopic tubular extension arm 28, 30. A first section 28 of the telescopic arm 30 can slide in and out of the other second section 30. A spring (not shown) biases the first section 28 out of the second section towards its maximum extended position.

Mounted on the end of the first section 28 remote from the main housing is a tubular support 34 and a shroud 32. A hole is formed through the shroud 32 to allow a cutting tool to pass through the shroud 32.

A dust collection box 36 releaseably connects to the front of the main housing 22. A filter (not shown) is mounted within the box 36.

A depth stop 500 is mounted at one end in a support ring 502 formed on the top of the second section 30 of the telescopic tubular extension arm and at the other, in an end stop mounted on the tubular support 34.

Another example of a dust extractor will now be described with reference to FIGS. 2 to 7. Where the same features are use in the embodiment that used in the example described with reference to FIG. 1, the same reference numbers have been used.

Figure 3:
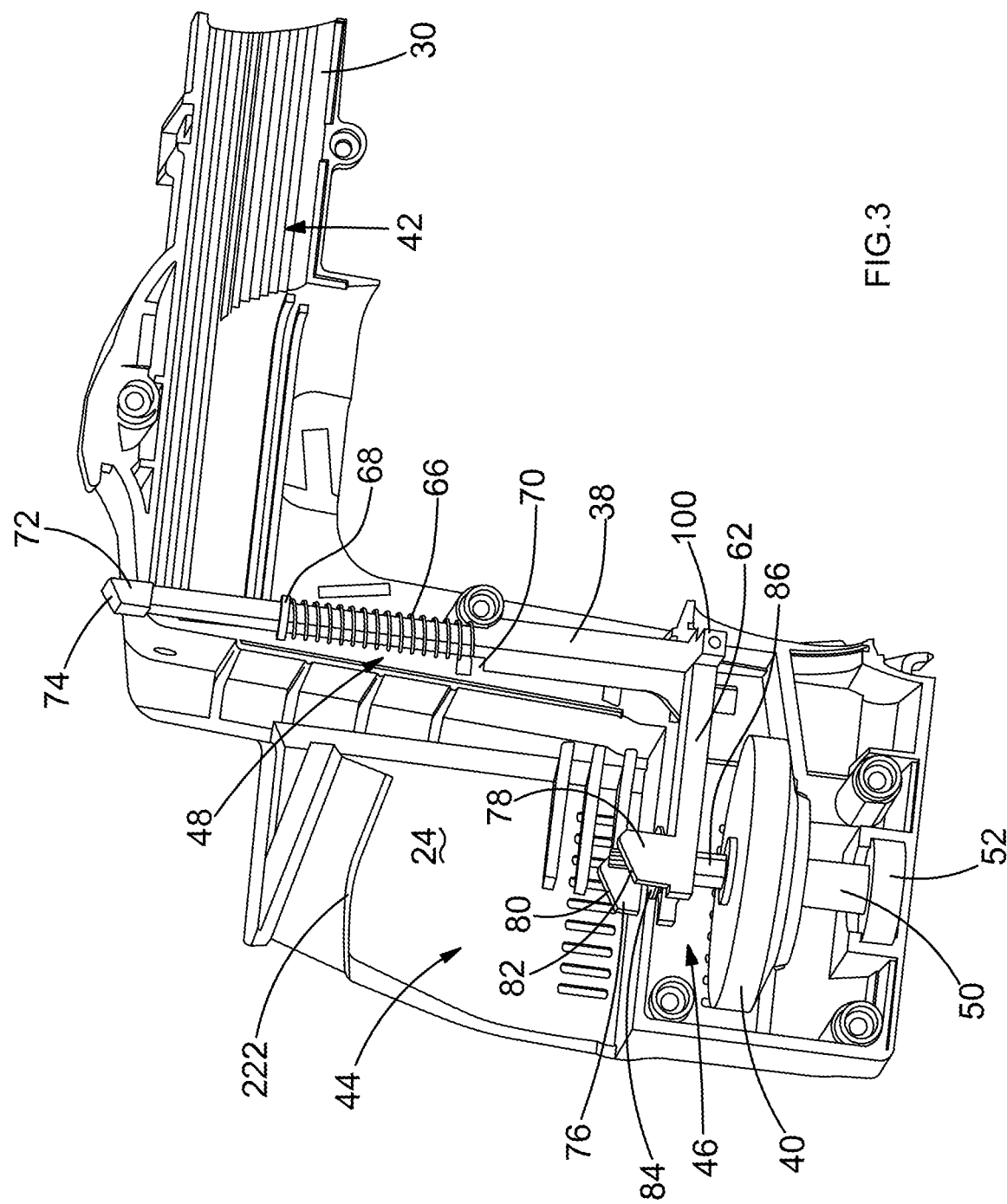
FIG. 3 shows a side view of one of the clam shells of the main housing of the dust extractor with a latch mechanism and a fan wheel.
Figure 4:
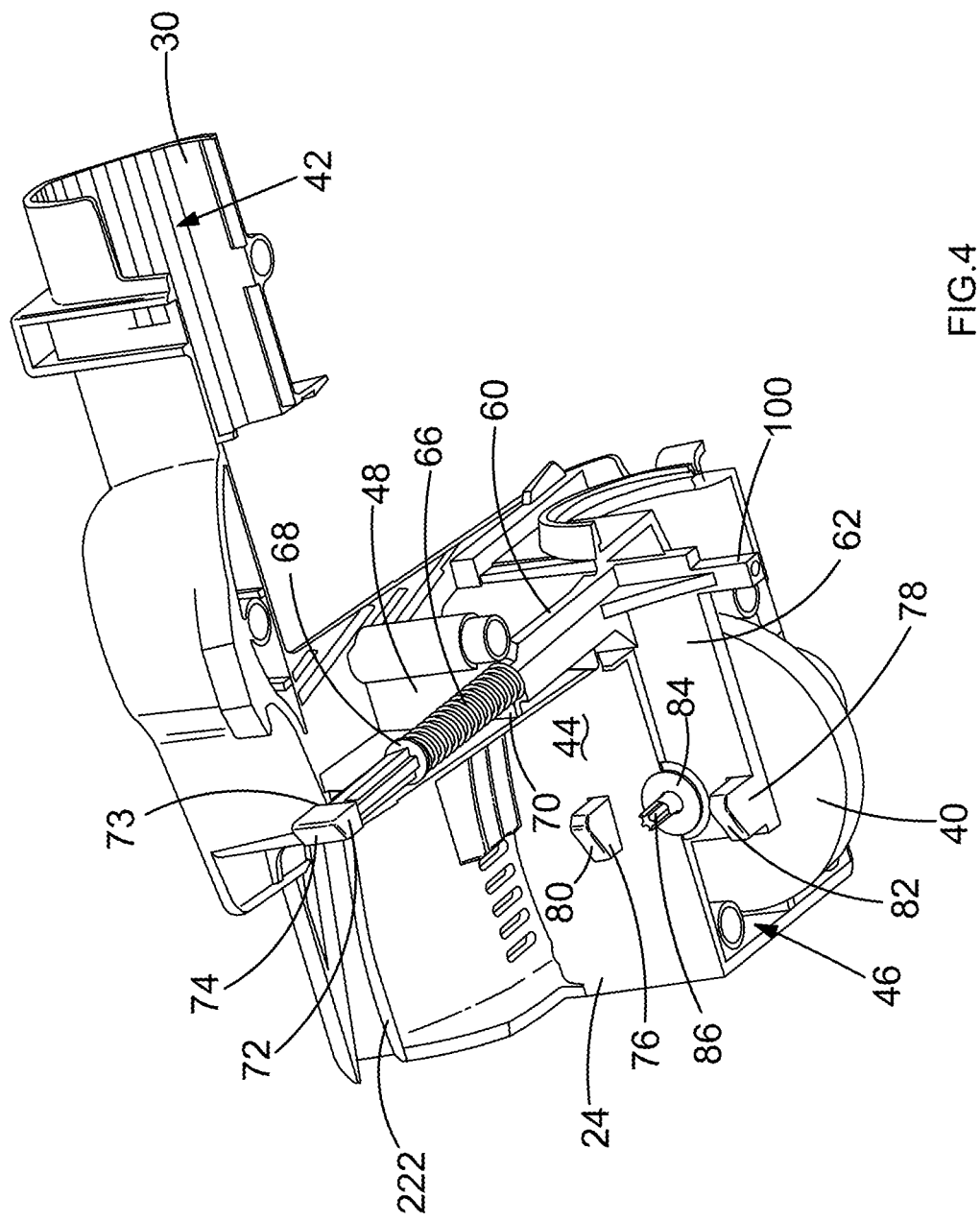
FIG. 4 shows a perspective view of one of the clam shells of the main housing of the dust extractor with latch mechanism and fan wheel.
Figure 5:
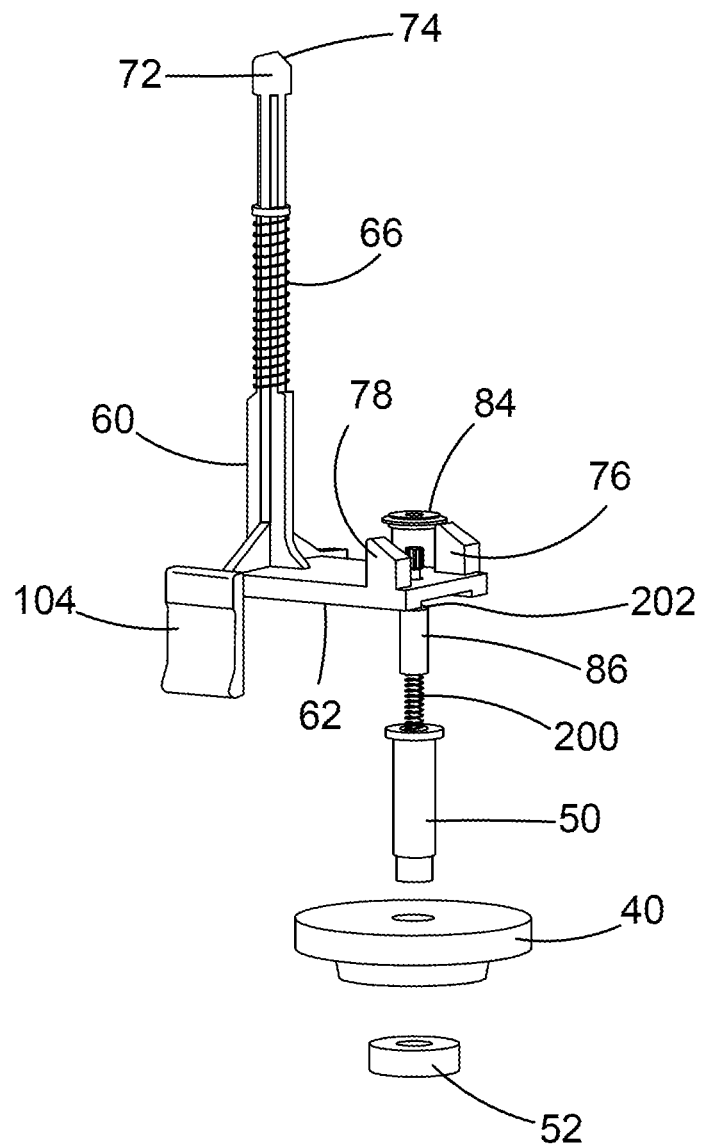
FIG. 5 shows an exploded view of the latch mechanism.
Figure 6:
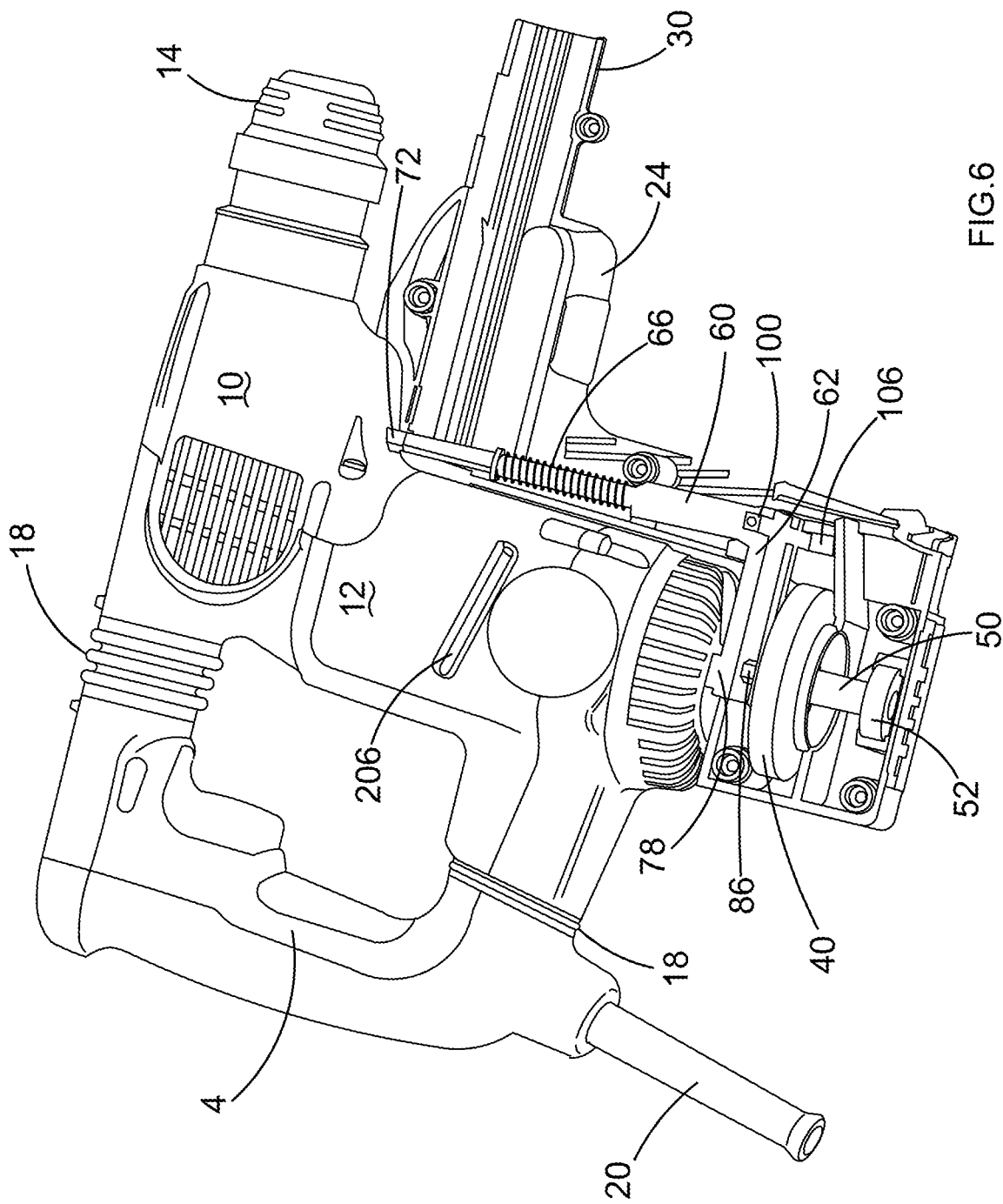
FIG. 6 shows a side view of one of the clam shells of the main housing of the dust extractor with latch mechanism and fan wheel attached to the hammer drill from a first side.
Figure 7:
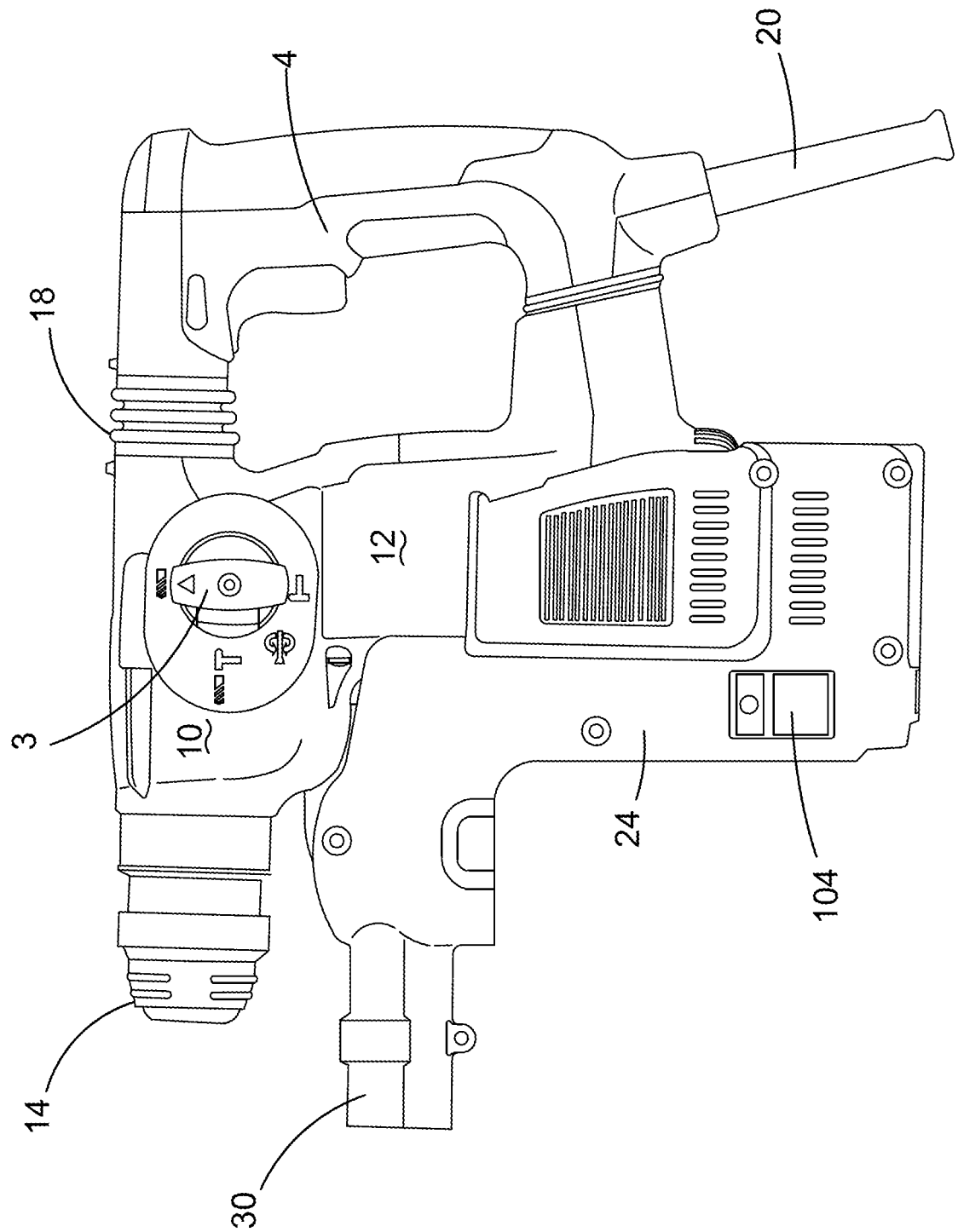
FIG. 7 shows a side view of the clam shell of FIG. 6 attached to the hammer drill from the other side.

Referring to FIG. 3 which shows a side view of one of the clam shells 24 of the main housing of the dust extractor with a latch mechanism 38 and fan wheel 40. The main housing is formed in four sections 42, 44, 46, 48. The first section 42 forms the second section 30 of the telescopic arm. The second section 44 forms a recess into which a part of the motor housing 12 of the hammer drill can slide in order for it to be attached to the dust extractor. The third section 46 forms a fan housing for the fan wheel 40. The fourth section 48 provides a chamber in which the latch mechanism 38 is slideably mounted within the main housing.

The fan wheel 40 is rigidly mounted on a tubular spindle 50 which is rotatably mounted in bearing 52 attached to the base wall of the third section 46. The fan 40 acts as a radial fan when rotationally driven.

The latch mechanism 38 comprises a horizontal plate 62 connected to one side of which is a vertical elongate rod 60. The elongate rod 60 is slideably mounted within the fourth section 48 of the main housing and can slide over a limited rand of movement along its longitudinal axis 64. A helical spring 66 surrounds the elongate rod 60 and is sandwiched between a shoulder 68 formed on the elongate rod 60 and the side of an internal wall 70 formed within the fourth section 48. The spring 66 biases the elongate rod to its upper most position.

A first catch 72, with a chamfered edge 74, is formed on the top end of the rod 60. When the elongate rod 60 is in its uppermost position, the catch 72 passes through an aperture 73 formed in the outer top wall of the main housing 22 of the dust extractor and extends upwardly away from the main housing 22. When the elongate rod 60 is moved to its lowermost position, the catch 72 is withdrawn from aperture 73 into the main housing 22 so that none the first catch 72 is external of the main housing 22.

Second and third catches 76, 78 are mounted in parallel on the sides of the plate 62 remote from the elongate rod 60. The second and third catches 76, 78 each comprises chamfers 80, 82 and are of the same dimensions as each other. The second and third catches 76, 78 extend in the same direction and in parallel to the first catch 72. When the elongate rod 60 is in its uppermost position, the plate 60 moves to its upper most position with the catches 76, 78 passing through apertures 75 formed in the upper wall of the third section 46 and extends into the recess formed by the second section 44. When the elongate rod 60 is moved to its lowermost position, the plate 62 also moves to its lowest position, withdrawing the catches 76, 78 from apertures 75 and moving them inside of the third section 46 with neither of the second or third catches 76, 78 extending into the second section 44.

Extending horizontally from the sides of the plate 62 in a symmetrical fashion and in opposite directions, adjacent the elongate rod 60, are two arms 100, 102. Each arm 100, 102 extend through apertures 106 formed within the side walls of the main housing 22. A button 104 is attached to the end of each arm 100, 102 which is external of the main housing and accessible by an operator so that the operation can engage with the buttons 104 and move the buttons 104 up and down, which in turn, move the latch mechanism 38 up and down.

Mounted in the plate 62, between the second and third catches 76, 78, is a bearing 84.

Mounted in a slideable manner within the top end of the tubular spindle 50 for the fan wheel 40 is a drive spindle 86 having torx connection at its top end. The drive spindle 86 can axially slide within the tubular spindle 50 but is rotationally fixed to the tubular spindle 50 such that rotation of the tubular spindle 50 results in rotation drive spindle 86. A helical spring 200 is located inside of the tubular spindle 50 and is sandwiched between an inner base wall of the tubular spindle 50 and a lower end of the drive spindle 86. The spring 200 urges the drive spindle 86 upwardly, out of the tubular spindle 50. The drive spindle 86 extends from the tubular spindle 50 and passes through the bearing 84 in the plate 62. The bearing 84 limits the upward movement of the drive spindle 86 due to a shoulder 202 formed on the drive spindle 86 engaging with the underside of the bearing 84. When the plate 62 and bearing 84 moves up and down, as the elongate rod 60 slides up and down, the drive spindle 86 also moves up and down due to the biasing force of the spring 200 urging the drive spindle 86 upwardly towards the position of the bearing 84, which limits the drive spindle's 86 upward movement.

Therefore, as the plate 60 moves up and down, the bearing 84 and drive spindle 86 both move up and down with the plate 60. When the plate 60 is in its uppermost position, the upper end of the drive spindle 86 is able to extend into the recess formed by the second section 44. When the plate 62 also moves to its lowest position, it moves the bearing 84 and hence the drive spindle 86 downwardly, withdrawing the drive spindle from the second section 44 and into the third section 46 with none of the drive spindle 86 extending into the second section 44.

Formed on each side of the motor housing 12 is a rib 206. The underside wall 208 of the motor housing 12 is flat with the edges 210 being curved to meet the side wall of the motor housing 12. Formed symmetrically on the underside wall 208 of the motor housing 12 are two recesses 212. An aperture 214, located between the two recesses 212, is formed through the centre of the underside wall 208. Located inside of the motor housing 12 adjacent the aperture is a socket 216 which is rigidly mounted on the end of the output spindle 242 of the electric motor 240 of the hammer drill. The socket 216 has a torx profile. The entrance to the socket 216 faces the aperture 214 so that the insertion of the drive spindle 86 into and through the aperture 214 would engage with the socket 216. Formed on the underside of the transmission housing 10 is a third recess 218. Forward of the third recess 218 is an inclined surface 220.

In order to mount the dust extractor onto the hammer drill, the front of the motor housing 12 is slid into the recess formed by the second section 44 of the main housing 22 of the dust extractor. As motor housing 12 enters the recess, the two ribs 206 engage with two walls 222 formed inside of the recess. The ribs 206 slide along the walls 22 and acts to guide the motor housing 12 inside of the recess. The sliding movement of the hammer drill into the recess is in a direction parallel to the axis of rotation A of the tool holder 14.

As the motor housing 12 enters the recess, the chamfered edge 74 of the first catch 72 engages with the inclined surface 222 on the underside of the transmission housing 10. The chamfered edges 80, 82 of the second and third catches 76, 78 engage with the rounded edges 210 of the underside wall 208 of the motor housing 12. As the motor housing 12 continues to enter the recess, the sliding movement of chamfered edges 74, 80, 82 over the inclined surface 220 and rounded edges 210 causes the three catches 72, 76, 78, and hence the whole latch mechanism 38, to be pushed downwardly inside of the main housing 22 of the dust extractor. As the latch mechanism 38 is pushed downwardly, the latch mechanism 38 moves downwardly against the biasing force of the spring 66. In addition, the movement of the latch mechanism 38 also results in the drive spindle 86 being moved downwardly, out of the recess and into the tubular spindle 50 against the biasing force of the spring 200 in the tubular spindle 50. As such, the latch mechanism 38 and drive spindle 86 are moved out of the way motor and transmission housings 10, 12 of the hammer drill and therefore the motor housing 12 can freely enter the recess.

When the motor housing 12 is fully inserted into the recess formed by the second section 44, the first catch 72 aligns with the recess 218 underneath the transmission housing 10. The second and third catches 76, 78 align with the two recesses 212 formed in the underside wall 208 of the motor housing 12. Therefore, the catches 72, 76, 78 can able to move into the recesses 212, 218. The spring 66 urges the latch mechanism 38 upwardly, causing the catches 72, 76, 78 to engage with the recesses 212, 218. When the catches 72, 76, 78 are engaged in the recesses 212, 218 and held there by the spring 66, the dust extractor is locked onto the hammer drill. When the latch mechanism 38 moves upwardly, the drive spindle 86 also moves upwardly towards the underside wall 208 of the motor housing 12. When the motor housing 12 is fully inserted into the recess formed by the second section 44, the aperture 214 formed through the underside wall 208 is aligned with the drive spindle 86. As such, the drive spindle 86 enters the aperture 214 and passes through the aperture 214 to engage with the socket 216. When the drive spindle 86 is engagement with the socket 216, rotation of the motor spindle results in rotation of the drive spindle 86, which in turn rotatingly drive tubular spindle 50 and hence the fan wheel 40. This creates a suction force to operate the dust extractor. In the event that the torx profile of the drive spindle 86 is not aligned with the torx profile of the socket 216, the drive spindle 86 will engage the end of the socket 216 and be prevented from further upward movement. However, the latch mechanism 38 is able to continue to rise to fully engage the catches 72, 76, 78 in the recesses 212, 218, the relative movement between the drive spindle 86 and latch mechanism 38 being accommodated by the compression of the spring 200 within tubular spindle 50. When the motor of the hammer drill is activated, the torx profile of the drive spindle 86 and that of the socket 216 will become aligned. Once aligned, the spring 200 in the tubular spindle 50 will push the drive spindle 86 upwardly, causing the end of the drive spindle 86 to engage with socket 216 so that the drive spindle 86 becomes drivingly engaged with the spindle of the motor.

Once the dust extractor is attached to the hammer drill and the drive spindle 86 is drivingly engaged with the motor spindle, the operation of the hammer drill will result in the automatic operation of the dust extractor. The space occupied by the hammer drill when it is attached to the dust extractor is referred to as the engagement region. In the present embodiment it includes, but is not limited to, the space formed by the recess formed by the second section 44 of the dust extractor and the area above the top wall of the main hosing where the first catch 72 is capable of extending.

The use of the chamfers 74, 80, 82 on the catches 72, 76, 78 allows the automatic movement of the latch 38 to move the catches 72, 76, 78 out the way of the hammer drill when the hammer drill is brought into engagement with the dust extractor. This allows the operator to simply push the dust extractor onto the hammer drill with no addition actions by the operator being required to engage the dust extractor with the hammer drill.

In order to release the dust extractor from the hammer drill, the operator slides the two buttons 104 downwardly on the main housing 22 the of the dust extractor. This moves the latch mechanism 38 downwardly against the biasing force of the spring 66. This results in the catches 72, 76, 78 disengaging from the recesses. As the latch mechanism 38 moves downward, it also results in the drive spindle 86 moving downwardly against the biasing force the spring 200 in the tubular spindle 50. As such the drive spindle 86 disengages with the socket 216 and is withdrawn from the aperture 214 in the underside wall 208 of the motor housing 12. As such, the motor housing can be freely slid out of the recess formed by the second section 44 of the dust extractor, separating the two from each other.

An embodiment of a dust extractor in accordance with the present invention will now be described with reference to FIGS. 8 to 27. Where the same features are used in the embodiment that used in the second example described with reference to FIGS. 2 to 7, the same reference numbers have been used. The embodiment of the present invention is the same as that in the second example described with reference to FIGS. 2 to 7 except that the dimensions have been altered to improve performance and an adaptor has been added to enable the dust extractor to be used with a range of hammer drills.

Figure 8:
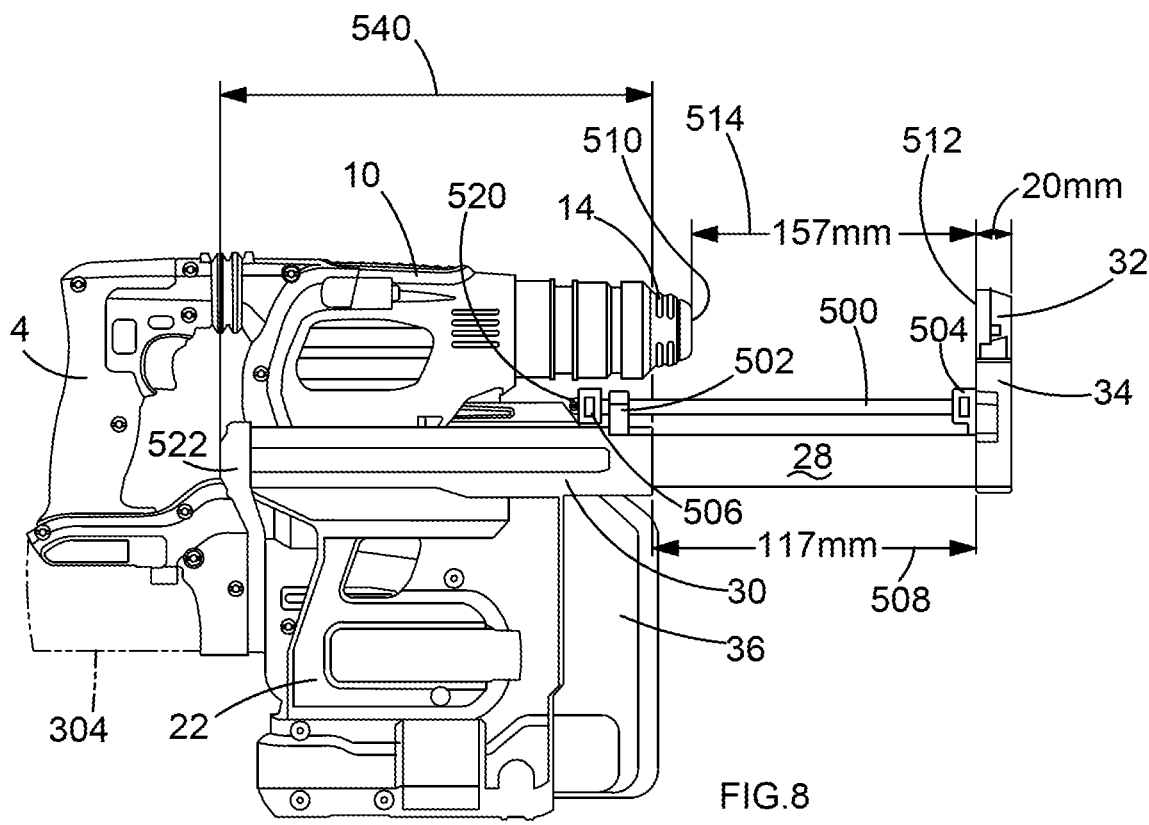
FIG. 8 shows a side view of a dust extractor according to the present invention attached to a first design of hammer drill powered by a battery.
Figure 9:
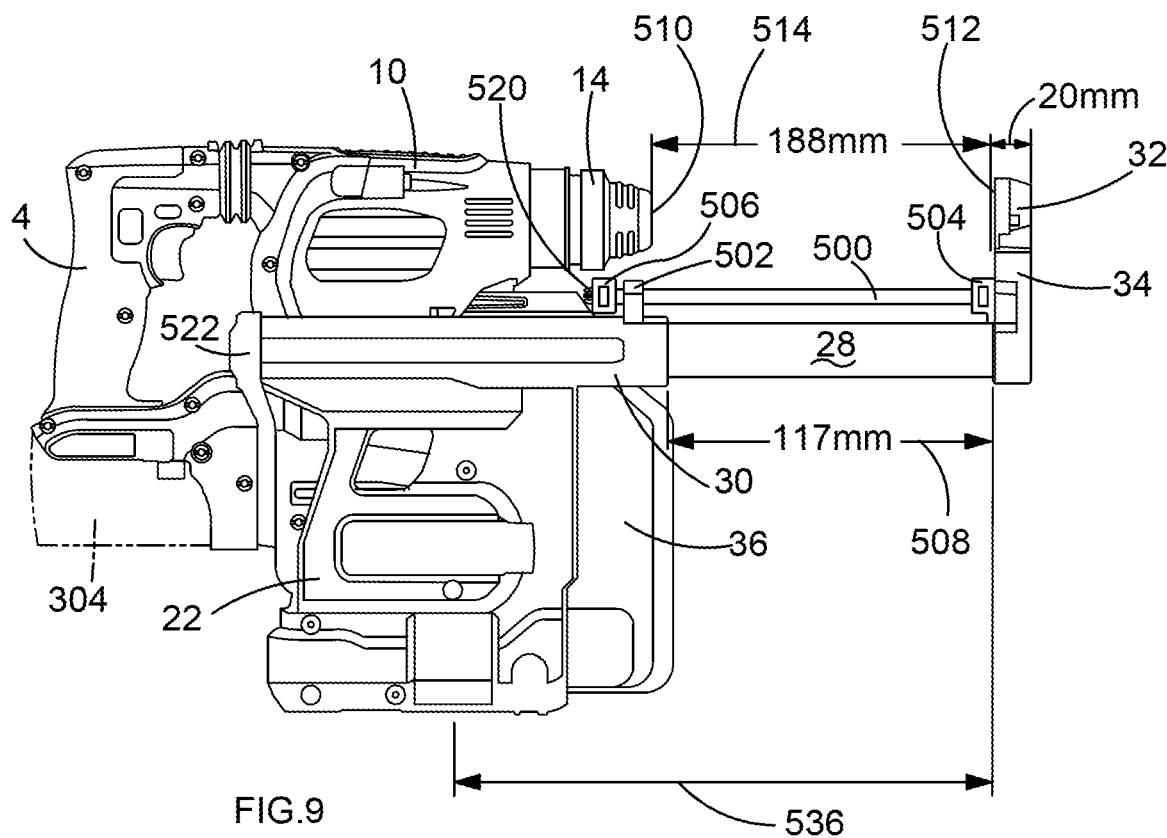
FIG. 9 shows a side view of the dust extractor according to the present invention attached to a second design of hammer drill powered by a battery.
Figure 10:
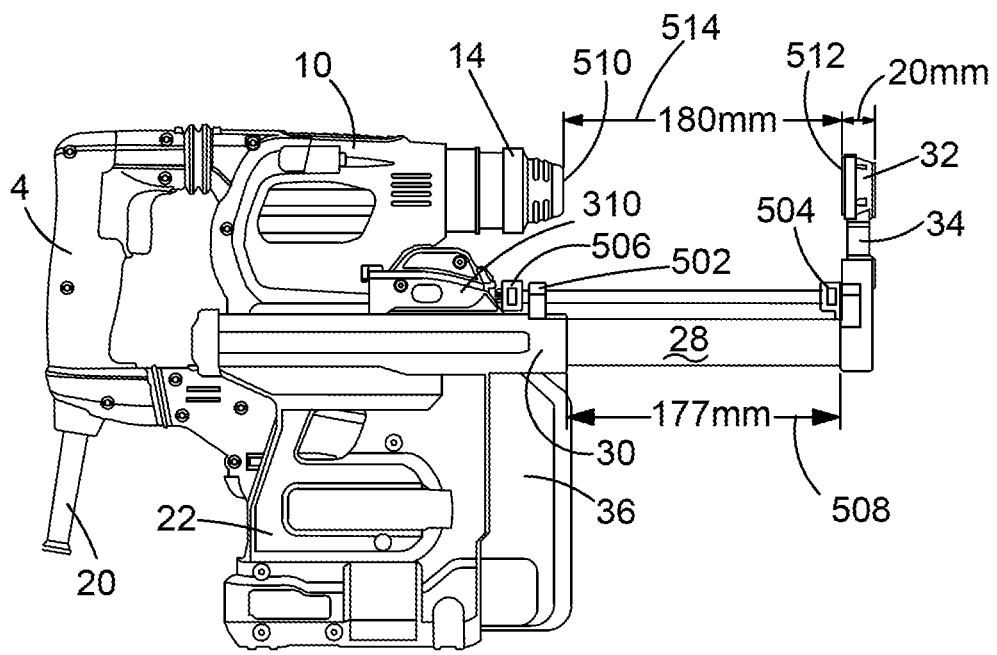
FIG. 10 shows a side view of a dust extractor according to the present invention attached to a third design of hammer drill powered by mains electricity.
Figure 11:
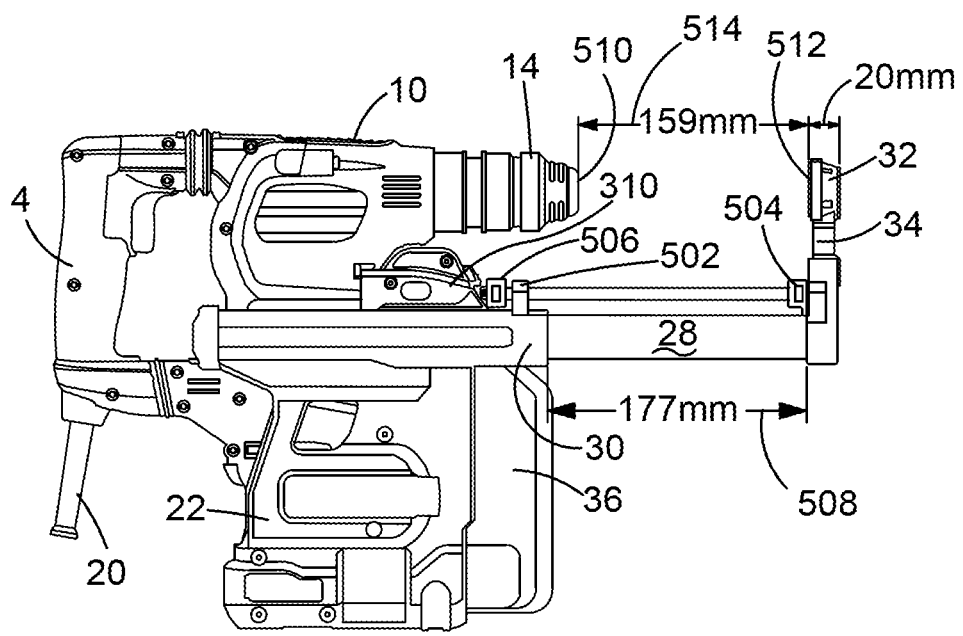
FIG. 11 shows a side view of a dust extractor according to the present invention attached to a fourth design of hammer drill powered by mains electricity.
Figure 12:
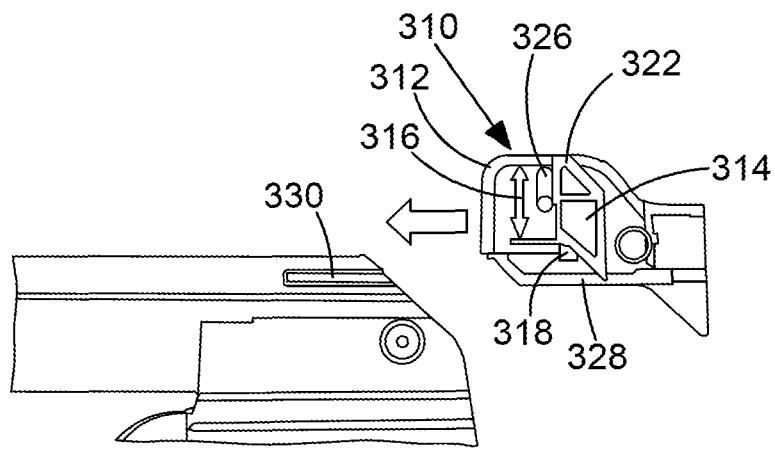
FIG. 12 shows a vertical cross section of a first embodiment of an adapter being fitted to the main housing of the dust extractor.
Figure 13:
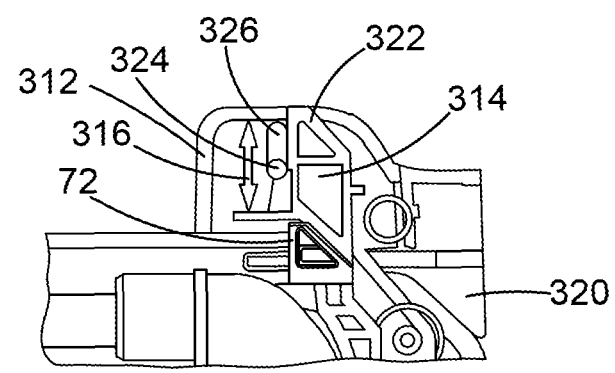
FIG. 13 shows a vertical cross section of the adapter mounted to the main housing of the dust extractor.
Figure 14:
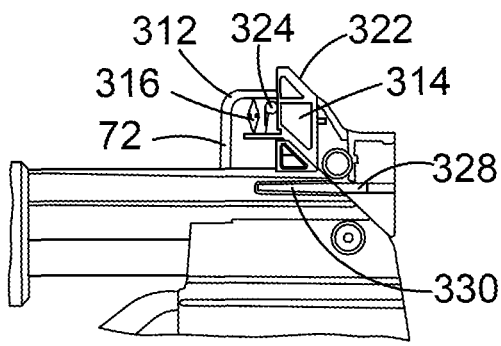
FIG. 14 shows a vertical cross section of the adapter mounted to the main housing of the dust extractor with the catch of the adaptor in its raised position.
Figure 15:
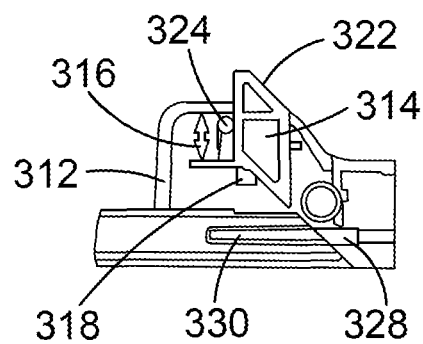
FIG. 15 shows a second view of a vertical cross section of the adapter mounted to the main housing of the dust extractor.
Figure 16:
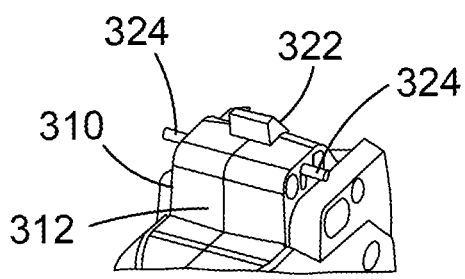
FIG. 16 shows a perspective view of the adapter mounted to the main housing of the dust extractor.
Figure 17:
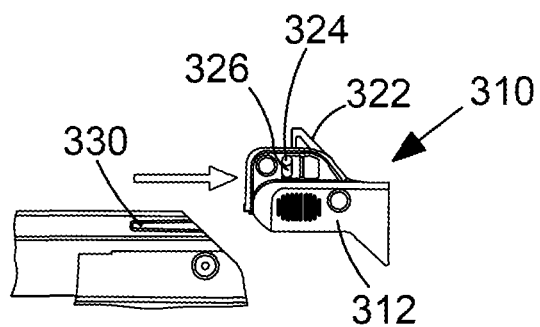
FIG. 17 shows a side view the adapter being removed from the main housing of the dust extractor.

The dust extractors shown in FIGS. 8 to 11 are identical in design. However, in each of the figures, the dust extractor is mounted on a different design of hammer drill. In FIGS. 8 and 9, the hammer drill is powered by a battery pack 304 (shown in dashed lines) which connects to the base of the rear handle 4. In FIGS. 10 and 11, the hammer drill is powered via an electric cable 20 which connects to the base of the rear handle 4 by which a mains AC electric power supply is supplied to the hammer drill. The electric motors 240 in each the battery powered hammer drills have a different stack length to the motors 240 in the mains powered hammer drills resulting the length of the motor housings 12 being different for each hammer. In order for the dust extractor to attach to the hammer drill, the first catch 72 has to engage with a recess 218 on the transmission housing 10. If the length of the motor housing 12 varies, then the position (vertically) of the transmission housing 10 from the base of the motor housing 12 will vary resulting in the position of recess 218 altering relative to the base of the motor housing 12. However, as the design of dust extractor remains fixed, the position of the catch 72 will remain the same.

In order to accommodate the different lengths of motor housing 12 on the mains powered hammer drills, an adapter 310 will be used. A first design of the adapter 310 will now be described with reference to FIGS. 12 to 17.

FIGS. 12 to 15 show a vertical cross section of a first embodiment of an adaptor 310. The adapter 310 comprises a housing 312 in which is mounted a catch 314. The catch 314 is capable of sliding vertically within the housing 312. A spring 316 (shown as an arrow) biases the 314 catch to its lowest position. An engagement pin 318 formed on the base of the catch 314 projects vertically downwardly. Formed on the top of the first catch 72 of the dust extractor is a recess 320 which is capable of receiving the engagement pin 318. The top 322 of the catch 314 is the same shape as the first catch 72 of the dust extractor. Two release pins 324, integrally formed with the catch 314, extend sideways, horizontally, and in opposite directions from the catch 314, each extending through a vertical elongate slot 326 formed through the side wall of the housing 312. Rails 328 are formed on the base of the housing 312. Formed on the top of the main housing 22 of the dust extractor are guides 330 which are capable of receiving the rails 328.

To attach the adapter, the rails 328 are slid into and along the guides 330. The engagement pin 318 engages the chamfer 74 of the first catch 72 causing the catch 314 to move upwards against the biasing force of the spring 316. When the engagement pin 318 aligns with the recess 320, the engagement pin 318 enters into the recess 320 under the biasing force of the spring 316. The adapter 310 is then locked onto the dust extractor. The catch 314 moves with the first catch 72, the spring 316 ensuring the catch 314 and the first catch 72 remain in contact with each other. The top 322 of the catch is then used to engage the recess 218 of the transmission housing 10, the top 322 engaging and disengaging the recess 218 by movement of the first catch 72 as described in the patent specification.

To remove the adapter from the dust extractor, the catch 314 is moved upwards within the housing 312 against the biasing force of the spring 316 by the operator engaging the release pins 324 and sliding them vertically upwards within the slots 326 against the biasing force of the spring 316. This disengages the engagement pin 318 from the recess 320 of the first catch 72. The adapter can then be slid of the dust extractor until the rails 328 disengage with the guides 330.

A second embodiment of the adaptor will now be described with reference to FIGS. 20 to 23. Where the same features are used in the second embodiment of adaptor that are used in the first embodiment described with reference to FIGS. 12 to 17, the same reference numbers have been used. The embodiment of the present invention is the same as that in the first embodiment except that a release button 550 has been added.

In the first embodiment, the two release pins 324 extend sideways, horizontally, and in opposite directions from the catch 314, each extending through a vertical elongate slot 326 formed through the side wall of the housing 312. In the second embodiment, there is only one release pin 324, which extends sideways, horizontally, from the catch 314, into a chamber formed inside of the housing 312.

The release button 550 comprises a bar 552 which can slide can slide horizontally (perpendicular to the catch 314) inside of the housing 312, the end 554 of which extends into the chamber. The end 554 is angled to form a chamfer. The bar 552 can slide from a first position (shown in FIGS. 20 and 21) where the button 550 extends from the housing 512 to a second position (shown in FIG. 23) where the button 550 is flush with the housing 312. When the bar 552 is in its first position, the end 554 is located adjacent to the pin 324. When the bar is in its first position the adaptor can be mounted on the dust extractor as described in relation to the first embodiment. In order to remove the adaptor from the dust extractor, the release button 550 is depressed. Depression of the release button causes the bar 552 to move towards its second position. As the bar 552 is moved from its first position to its second position, the end 554 engages with the pin 324 and causes it to side along its angle surface causing it to move upwardly, the end 554 acting as a cam, the pin 324 acting as a cam follower. As the pin 324 moves upwardly, the catch 314 also moves upwardly against the biasing force of the spring 316. This causes the pin 318 to become disengaged from the recess 320 of the first catch 72 of the dust extractor. The adapter can then be slid of the dust extractor until the rails 328 disengage with the guides 330. The bar 552 is biased towards its first position by a spring 556.

Referring to the design of the dust extractor, the telescopic extension arm 28, 30 is arranged on the main housing such that, when the dust extractor is mounted on a hammer drill, the telescopic extension arm 28, 30 extends along the side of the motor housing 12 in a direction parallel to the axis of rotation of the tool holder 14.

The first forward section 28 of the telescopic arm is capable of sliding into or out the second rear section 30 between a first inner position where the least amount of the first forward section 28 is exposed and a second outer position where the greatest amount of the first forward section 28 is exposed. The stroke length 508 of the telescopic extension arm 28, 30 is the distance that the first front section 28 can slide from its second outer position into the second rear section 30 to its first inner position (i.e. the maximum amount of movement the shroud 32 can travel towards the main housing 22 from its fully extended position), is greater than 150 mm, and preferably greater 170 mm, and preferably greater 170 mm, and ideally or greater than 177 mm.

The length 540 of the second rear section 30 is 240 mm. The ratio of the stroke length 508 to the length 540 of the second rear section 30 is preferably greater than 62.5%, and is more preferably greater than 70.8%, and is more preferably greater than 72.9%, and more preferably is equal to or greater than 73.7%.

When the dust extractor is mounted on a hammer as shown in FIGS. 8 to 11, the shroud distance 514 between the end 510 of the tool holder 14 and rear side 512 of the shroud 32, when the first front section 28 is fully extended from the rear second section 30 can vary depending on the design of the hammer drill. In certain designs, the shroud distance 514 is less than the stroke length 508. For other designs, the shroud distance 514 is greater than the stroke length 508.

The suction force experienced through the telescopic extension arm 28, 30 and/or shroud 32 is preferably greater than 1.5 MPa (Megapascal), and preferably greater than 1.8 MPa and is preferably is equal to or greater than 2.0 MPa.

The depth stop 500 is mounted at one end in the support ring 502 formed on the top of the second section 30 of the telescopic tubular extension arm and at the other, in an end stop 504 mounted on the tubular support 34. The depth stop can freely slide through the support ring 502. When the first forward section (28) of the telescopic arm slides into or out of the second rear section 30, the depth stop 500 moves with it. A releasably lockable catch 506 can be slid along and fixed to the depth stop 500 to adjust the depth stop. When the first forward section (28) of the telescopic arm is slid into the second rear section (30) to its first inner position where the least amount of the first forward section 28 is exposed, the rear end 520 of the depth stop 500 is located forward of the rear end 522 of the second rearward section 30 of the telescopic arm.

Figure 18:
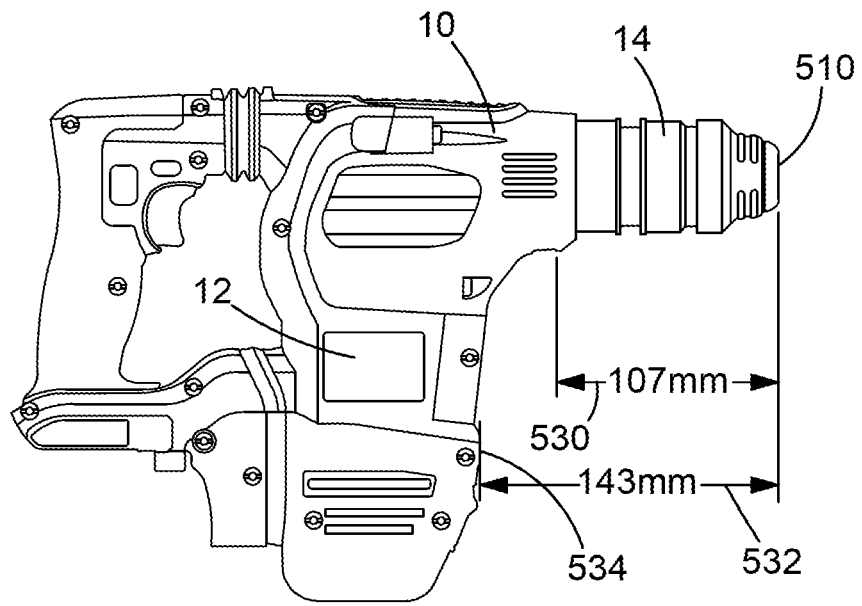
FIG. 18 shows a side view of the hammer drill shown in FIG. 8.

FIG. 18 shows a side view of the hammer drill shown in FIG. 8. The length 530 of the tool holder 14 is 107 mm. The length 532 from the front 534 of the motor housing 12 and front end 510 of the tool holder 14 is 143 mm. when the dust extractor is mounted on the hammer drill shown in FIG. 18, the length 536 of the distance between the front 534 of the motor housing 12 and the rear side 512 of the shroud 32, when the first front section 28 is fully extended from the rear second section 30, is 302 mm.

Figure 19:
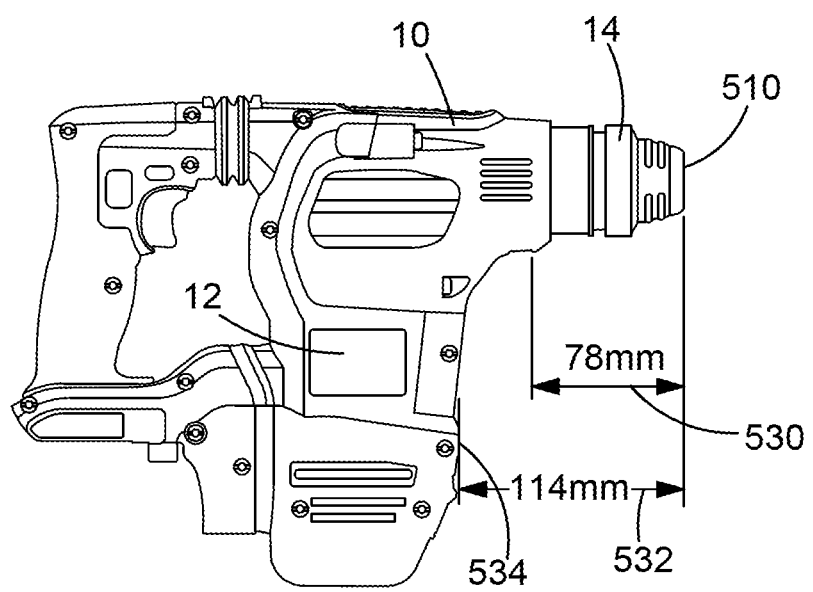
FIG. 19 shows a side view of the hammer drill shown in FIG. 9.
Figure 20:
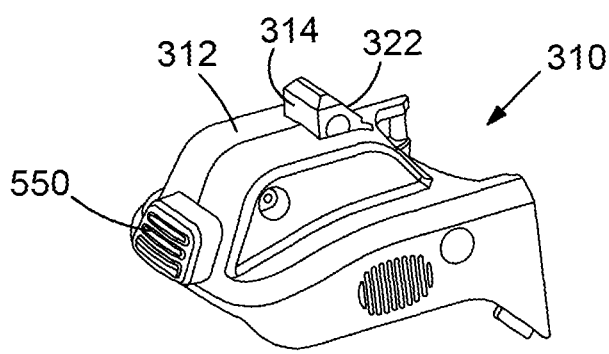
FIG. 20 shows a perspective view of a second embodiment of the adapter.
Figure 21:
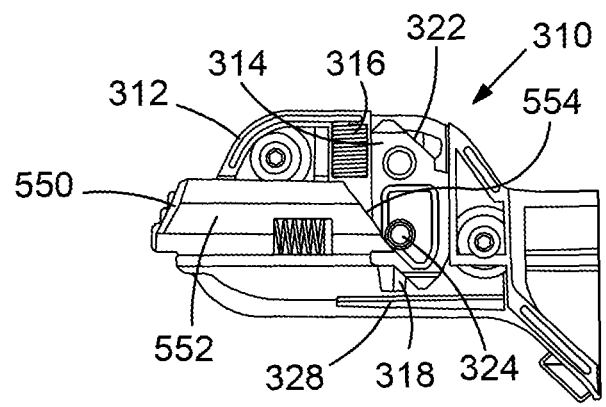
FIG. 21 shows a vertical cross section of the second embodiment of the adapter in an unlocked position.
Figure 22:
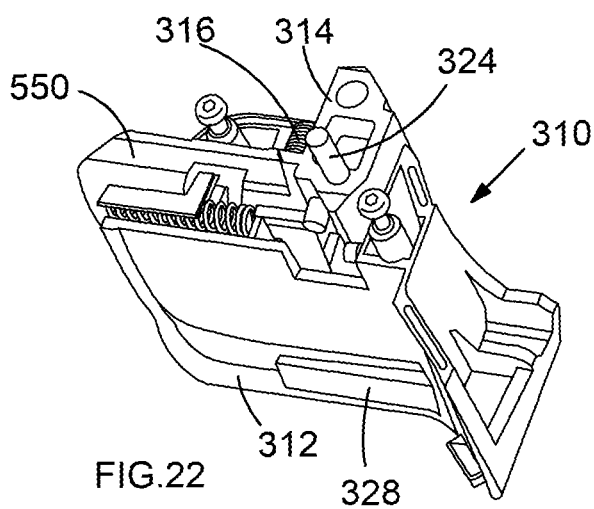
FIG. 22 shows a cut away perspective view of the adaptor.
Figure 23:
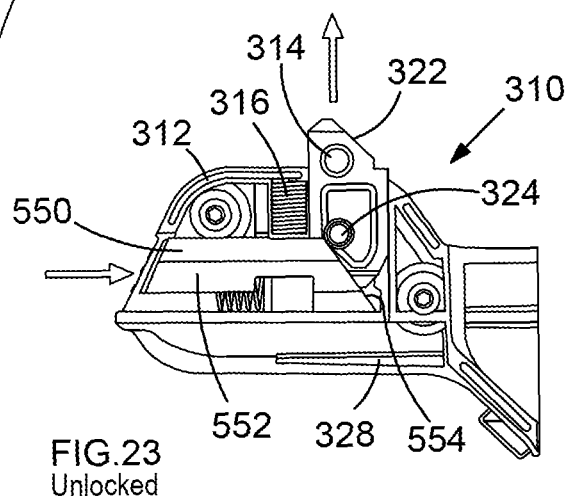
FIG. 23 shows a vertical cross section of the second embodiment of the adapter in a locked position.

FIG. 19 shows a side view of the hammer drill shown in FIG. 9. The length 530 of the tool holder 14 is 78 mm. The length 532 from the front 534 of the motor housing 12 and front end 510 of the tool holder 14 is 114 mm. when the dust extractor is mounted on the hammer drill shown in FIG. 18, the length 536 of the distance between the front 534 of the motor housing 12 and the rear side 512 of the shroud 32, when the first front section 28 is fully extended from the rear second section 30, is 302 mm.

Figure 24:
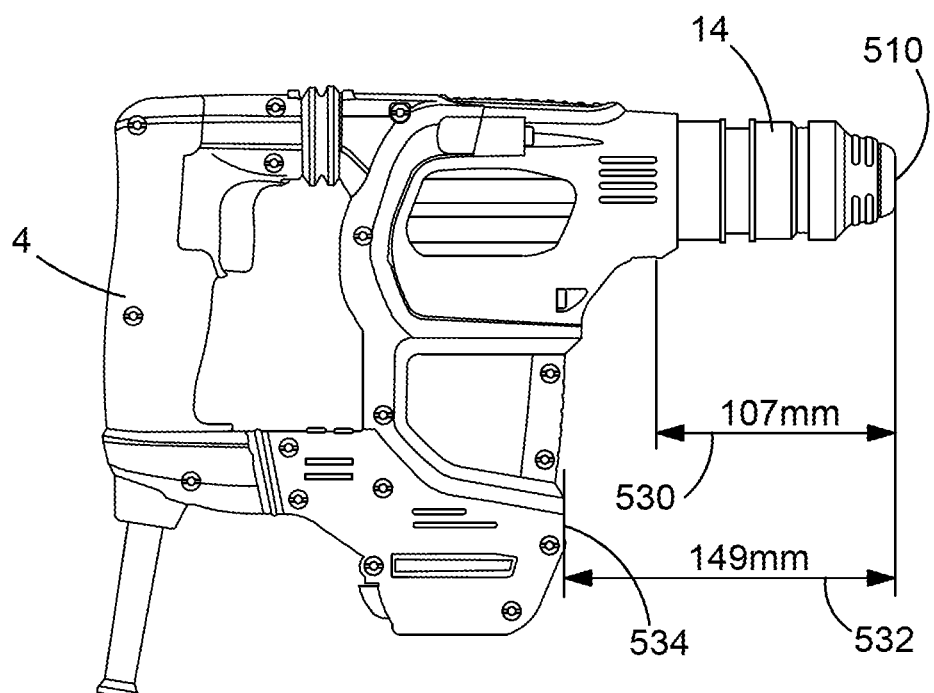
FIG. 24 shows a side view of the hammer drill shown in FIG. 11.

FIG. 24 shows a side view of the hammer drill shown in FIG. 11. The length 530 of the tool holder 14 is 107 mm. The length 532 from the front 534 of the motor housing 12 and front end 510 of the tool holder 14 is 149 mm. When the dust extractor is mounted on the hammer drill shown in FIG. 24, the length 536 of the distance between the front 534 of the motor housing 12 and the rear side 512 of the shroud 32, when the first front section 28 is fully extended from the rear second section 30, is 306 mm.

Figure 25:
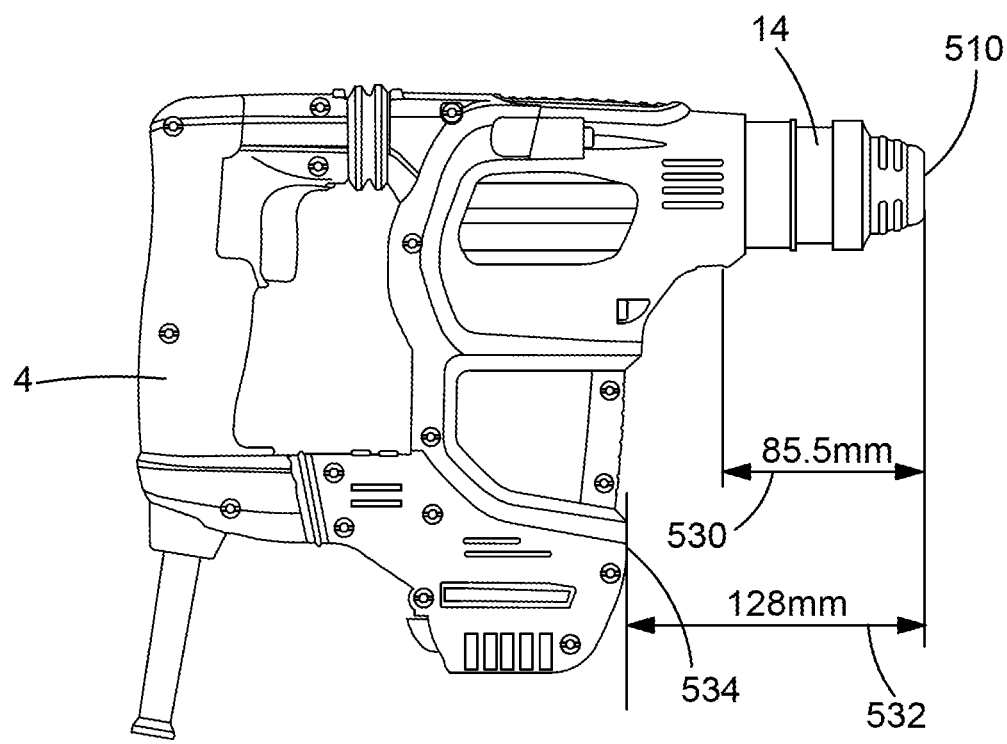
FIG. 25 shows a side view of the hammer drill shown in FIG. 10.
Figure 26:
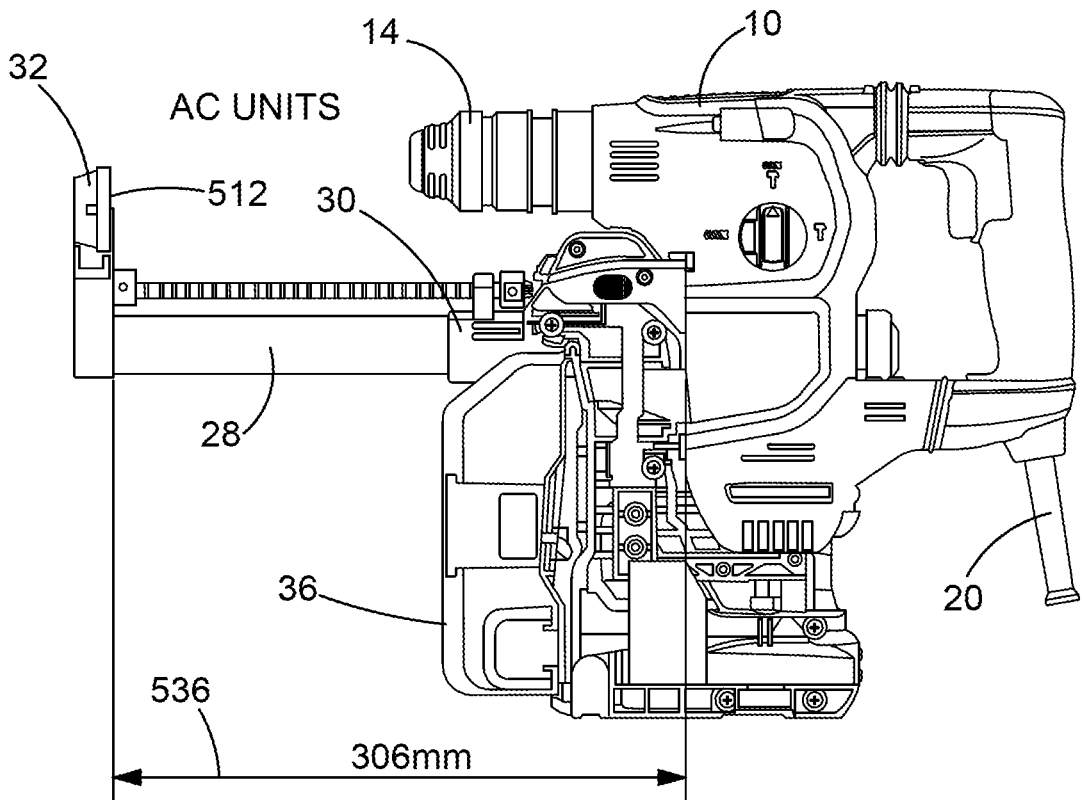
FIG. 26 shows a side view of the dust extractor according to the present invention attached to a fourth design of hammer drill powered by mains electricity shown in FIG. 11 from the opposite side as that shown in FIG. 11 with part of the dust extractor housing cut away.
Figure 27:
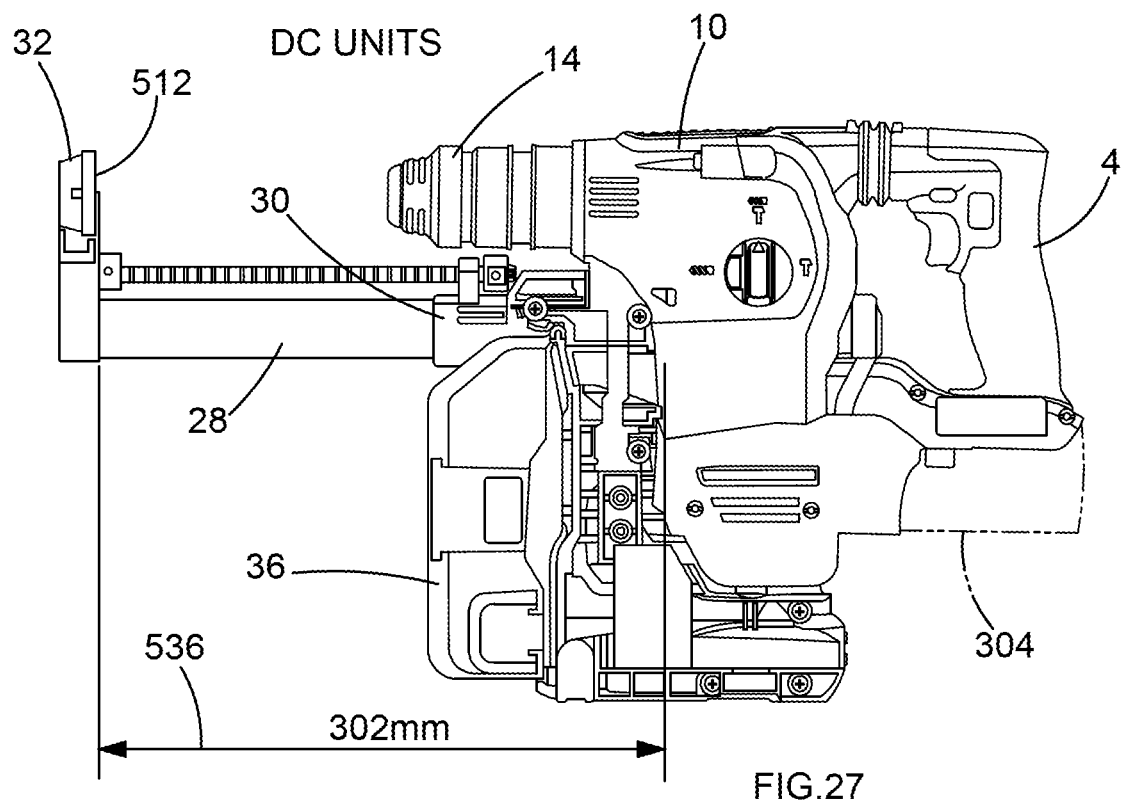
FIG. 27 shows a side view of the dust extractor according to the present invention attached to a third design of hammer drill powered by mains electricity shown in FIG. 10 from the opposite side as that shown in FIG. 10 with part of the dust extractor housing cut away.

FIG. 25 shows a side view of the hammer drill shown in FIG. 10. The length 530 of the tool holder 14 is 85.5 mm. The length 532 from the front 534 of the motor housing 12 and front end 510 of the tool holder 14 is 128 mm. When the dust extractor is mounted on the hammer drill shown in FIG. 10, the length 536 of the distance between the front 534 of the motor housing 12 and the rear side 512 of the shroud 32, when the first front section 28 is fully extended from the rear second section 30, is 306 mm.

When the dust extractor is mounted on a range of hammer drills, the length 536 of the distance between the front 534 of the motor housing 12 and the rear side 512 of the shroud 32 when the first front section 28 is fully extended from the rear second section 30, is between 295 mm and 310 mm, and preferably between 297 mm and 307 mm and more preferably between 299 mm and 307 mm and more preferably between 301 and 307 mm.

When the dust extractor is mounted on a range of hammer drills, the ratio of the stroke length 508 to the length 536 (which is the distance between the front 534 of the motor housing 12 and the rear side 512 of the shroud 32, when the first front section 28 is fully extended from the rear second section 30) is preferably greater than 50%, and more preferably greater than 55%, and more preferably equal to or greater than 57.8%, and more preferably equal to or greater than 58.6% and preferably 59% or greater.

Whilst the embodiment of present invention has been described in relation to a hammer drill, it will be appreciated that the scope of the invention could include any type of drill.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A dust extractor comprising:
   a main housing;
   a telescopic tubular extension arm comprising a first forward section slidable into or out of a second rear section over a stroke length between a first inner position and a second outer position, the second rear section being mounted onto the main housing;
   a shroud mounted on one end of the first forward section remote from the second rear section;
   a biasing force arranged to urge the first forward section to slide out of the second rear section towards the second outer position; and
   a dust collection box mounted on the main housing,
   wherein the stroke length of the telescopic extension arm is greater than 150 mm and a suction force experienced through at least one of the telescopic extension arm and/or shroud is equal to or greater than 1.5 MPa (Megapascal).

2. The dust extractor of claim 1, wherein the stroke length of the telescopic extension arm is greater than 170 mm.

3. The dust extractor of claim 1, wherein the stroke length of the telescopic extension arm is greater than 175 mm.

4. The dust extractor of claim 1, wherein the stroke length of the telescopic extension arm is equal to or greater than 177 mm.

5. The dust extractor of claim 1, wherein a suction force experienced through at least one of the telescopic extension arm and/or shroud is greater than 1.8 MPa (Megapascal).

6. The dust extractor of claim 1, wherein a suction force experienced through at least one of the telescopic extension arm and/or shroud is equal to or greater than 2.0 MPa (Megapascal).

7. The dust extractor of claim 1, wherein a ratio of the stroke length to a length of the second rear section is greater than 62.5%.

8. The dust extractor of claim 1, wherein a ratio of the stroke length to a length of the second rear section is greater than 70.8%.

9. The dust extractor of claim 1, wherein a ratio of the stroke length to a length of the second rear section is equal to or greater than 73.7%.

10. A tool combination comprising:
    a dust extractor according to claim 1; and
    a drill comprising:
       a main housing including a motor housing mounted below a transmission housing;
       a rear handle attached to the rear of the main housing; and
       a tool holder mounted on the front of the transmission housing;
    wherein, when the dust extractor is mounted on the hammer drill, a distance between a front of the motor housing and a rear side of the shroud, when the first front section is fully extended from the rear second section, is between 295 mm and 310 mm.

11. The tool combination of claim 10, wherein the distance between the front of the motor housing and the rear side of the shroud, when the first front section is fully extended from the rear second section, is between 297 mm and 307 mm.

12. The tool combination of claim 10, wherein the distance between the front of the motor housing and the rear side of the shroud, when the first front section is fully extended from the rear second section, is between 299 mm and 307 mm.

13. The tool combination of claim 10, wherein the distance between the front of the motor housing and the rear side of the shroud, when the first front section is fully extended from the rear second section, is between 301 mm and 307 mm.

14. A tool combination comprising:
    a dust extractor comprising:
       a main housing;
       a telescopic tubular extension arm comprising a first forward section slidable into or out of a second rear section over a stroke length between a first inner position and a second outer position, the second rear section being mounted onto the main housing;
       a shroud mounted on one end of the first forward section remote from the second rear section;
       a biasing force arranged to urge the first forward section to slide out of the second rear section towards the second outer position; and
       a dust collection box mounted on the main housing,
       wherein the stroke length of the telescopic extension arm is greater than 150 mm; and
    a drill comprising:
       a main housing including a motor housing mounted below a transmission housing;
       a rear handle attached to the rear of the main housing; and
       a tool holder mounted on the front of the transmission housing;
    wherein, when the dust extractor is mounted on the hammer drill, a ratio of the stroke length to a distance between a front of the motor housing and a rear side of the shroud, when the first front section is fully extended from the rear second section, is greater than 50%.

15. The tool combination of claim 14, wherein the ratio of the stroke length to the distance between the front of the motor housing and the rear side of the shroud, when the first front section is fully extended from the rear second section, is greater than 55%.

16. The tool combination of claim 14, wherein the ratio of the stroke length to the distance between the front of the motor housing and the rear side of the shroud, when the first front section is fully extended from the rear second section, is equal to or greater than 57.8%.

17. The tool combination of claim 14, wherein the ratio of the stroke length to the distance between the front of the motor housing and the rear side of the shroud, when the first front section is fully extended from the rear second section, is equal to or greater than 58.6%.

18. The tool combination of claim 14, wherein the ratio of the stroke length to the distance between the front of the motor housing and the rear side of the shroud, when the first front section is fully extended from the rear second section, is equal to or greater than 59.0%.

19. A dust extractor comprising:
a main housing;
a telescopic tubular extension arm comprising a first forward section slidable into or out of a second rear section over a stroke length between a first inner position and a second outer position, the second rear section being mounted onto the main housing;
a shroud mounted on one end of the first forward section remote from the second rear section;
a biasing force arranged to urge the first forward section to slide out of the second rear section towards the second outer position; and
a dust collection box mounted on the main housing,
wherein the stroke length of the telescopic extension arm is greater than 150 mm and a ratio of the stroke length to a length of the second rear section is greater than 62.5%.

* * * * *